United States Patent

Jacks et al.

Patent Number: 5,829,047
Date of Patent: Oct. 27, 1998

[54] BACKUP MEMORY FOR RELIABLE OPERATION

[75] Inventors: Steven Anthony Jacks, Villa Park, Ill.; Kevin John McNeley, Succasunna, N.J.

[73] Assignee: Lucent Technologies Inc., Murray Hill, N.J.

[21] Appl. No.: 703,145

[22] Filed: Aug. 29, 1996

[51] Int. Cl.$^6$ .................................................. G06F 13/00
[52] U.S. Cl. .......................... 711/162; 711/118; 711/154; 711/159; 711/161; 711/163; 711/173
[58] Field of Search .................................. 711/162, 164, 711/163; 395/182.18, 182.13, 182.04; 364/187; 707/204; 365/189.01

[56] References Cited

U.S. PATENT DOCUMENTS

| | | | |
|---|---|---|---|
| 4,654,819 | 3/1987 | Stiffler et al. ............................ | 711/162 |
| 4,814,982 | 3/1989 | Weir ......................................... | 711/164 |
| 4,819,154 | 4/1989 | Stiffler et al. ....................... | 395/182.18 |
| 4,959,768 | 9/1990 | Gerhart ..................................... | 364/187 |
| 4,996,687 | 2/1991 | Hess et al. .......................... | 395/182.13 |
| 5,163,148 | 11/1992 | Walls ....................................... | 707/204 |
| 5,193,071 | 3/1993 | Umina et al. ....................... | 365/189.01 |
| 5,592,650 | 1/1997 | Okatani et al. .......................... | 711/163 |
| 5,634,038 | 5/1997 | Saitoh ..................................... | 711/163 |
| 5,675,725 | 10/1997 | Malcolm ............................ | 395/182.04 |

Primary Examiner—Tod R. Swann
Assistant Examiner—Fred F. Tzeng

[57] ABSTRACT

In order to provide reliable backup memory for the operational memory (RAM) of a control unit, two segments of a memory with write protect facility are used. Only one of these segments contains the backup memory at any one time, but the other segment may be updated with a new release. Write protect is removed from one of these segments only when an update is taking place. The software for controlling initialization of the operational memory from the backup memory is stored in the backup memory. Extensive checks are performed before accepting an update of the backup memory or an initialization of the operational memory.

15 Claims, 4 Drawing Sheets

BACKUP MEMORY FOR RELIABLE OPERATION

RELATED APPLICATIONS

This application is related to D. L. Anderson and S. A. Jacks: "Reliable Backup Memory" and to S. A. Jacks and K. J. McNeley: "Software for Controlling a Reliable Memory," both of which applications are being filed simultaneously with the application and being assigned to the same assignee as this application.

TECHNICAL FIELD

This invention relates to arrangements for providing reliable backup memory for initializing the active memory of a processing system or control system.

PROBLEM

In fields such as telecommunications systems, the demands for reliable processing of control data for controlling the establishment of connections have been made ever more severe as these systems control ever larger numbers of telecommunications terminals and facilities for interconnecting telecommunications switches. Such systems are normally controlled by programs that are stored in the memory of the processors. The memory of the processors contains not only programs but critical data describing a particular switch and other data needed by the control programs to control the operations of a switch. Such programs are normally stored in an operational random access memory (RAM) which makes them vulnerable to errors in falsely writing data and/or errors brought about because of problems in the program. Experience has shown that updating a program for critical data is a function which may take place as often as weekly; during this time, the operational RAM is particularly vulnerable to the introduction of errors in its program or static data.

Providing a backup memory, to store a backup for the critical contents of the RAM is not a foolproof solution either, because the updating of the backup memory to accommodate a new program is a process which is fraught with possibilities of false operations resulting in defective initialization and backup data.

A problem of the prior art therefore is that there is no fully satisfactory arrangement for providing reliable backup for critical programs and data stored in RAM.

SOLUTION

The above problem is solved and an advance is made over the prior art in accordance with applicants' invention, wherein a backup memory is provided with selective write protection in each of at least two segments of the backup memory. Such a backup memory may be RAM and can even be part of RAM used for operational purposes. Arrangements, are made to prevent both a segment being updated and a segment containing the latest version of backup programs and data from having write protection removed simultaneously. Each segment contains enough memory so that the operational RAM can be fully initialized from the contents of that segment. When the backup is updated, the segment which does not contain the latest data for initializing the RAM has write protection removed and is written into with the new data for initializing the RAM. After this data has been recorded in that segment of memory and after checks have been made concerning the validity of the record, that segment becomes active and has its write protection reapplied. After the craft has accepted proper operation of the system as initialized from the newly active segment of backup memory, write protection can be removed from another segment and that other segment can have its memory cleared (reset to zero), or the other segment can simply be left alone. Advantageously, this arrangement provides an essentially equivalent duplicate storage mechanism while requiring only a single set of drivers and read and write amplifiers for the backup memory.

In applicants' preferred embodiment, the RAM and the backup memory are in a common control that is duplicated. When a program update is required, one of the duplicate common controls is switched off-line and receives the updated program in its RAM. This updated program is then written from the RAM into the cleared segment of the backup memory and then the program and data now stored in that segment of the backup memory is used to initialize the RAM; the common control is now available for service. If trouble occurs in the other common control while this updating is taking place, the RAM is initialized from the old version stored in the backup memory and the common control is switched back into service, to be updated later.

In applicants' preferred embodiment, an initialized backup memory contains a program for controlling the initialization of a RAM. The program is stored as a series of functions and a series of transfer vectors for locating each of these functions. The initializing program is stored in the first part of a segment of the backup memory. The rest of the data stored in the backup memory includes programs, transfer vectors, static data and a check table, i.e., a table of cyclic redundancy check (CRC) words, each for checking 2K of image. Advantageously such an arrangement minimizes the need for non-changeable read-only memory (ROM), required for controlling the initiation of the initialization functions, which has the attendant problems of not being able to change such memory without changing a device.

The program for updating the backup memory is initially stored in the backup memory. It is then written into RAM and that RAM-stored program controls the backup memory update.

DETAILED DESCRIPTION

Figure 1:
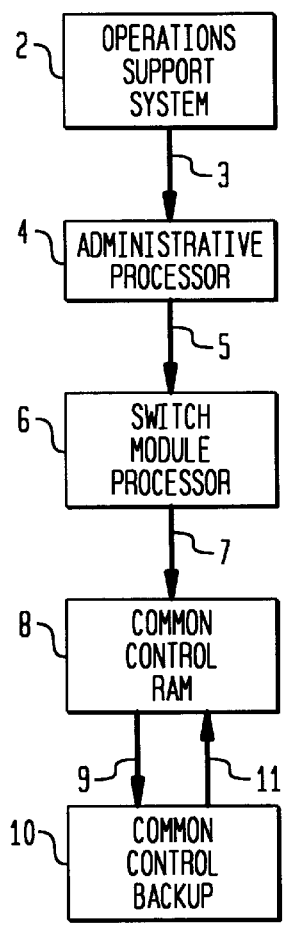
FIG. 1 is an overall diagram showing the flow of data for the exemplary embodiment of applicants' invention.

FIG. 1 is a block diagram illustrating a specific preferred embodiment of which applicant's invention is a critical part. An operations support system 2 transmits data over a link 3 to the administrative processor 4 of a switch (not shown) such as the 5ESS® switch manufactured by Lucent Technologies Inc. In this embodiment, the administrative processor forwards this new data over another link 5 to a Switch Module Processor (SMP) 6 which is within a switch module of the switch. The switch module includes a DNU (digital networking unit)/SONET interface controlled by duplicated common controls. One of the common controls has been changed to be in an off-line state in order to have its memory updated. The SMP 6 transmits the initialization data over link 7 to that common control where it is stored in RAM 8. The common control RAM data is then used to initialize the common control backup memory 10 in a process indicated by arrow 9. The backup memory is then used to initialize the common control RAM 8 in a process indicated by arrow 11. The processes of arrows 9 and 11 are described in detail within FIGS. 4 and 5. After this action has been completed, the off-line common control is changed to be in an on-line state and the other of the duplicated common control units is placed off-line to have its backup memory and RAM initialized.

Figure 2:
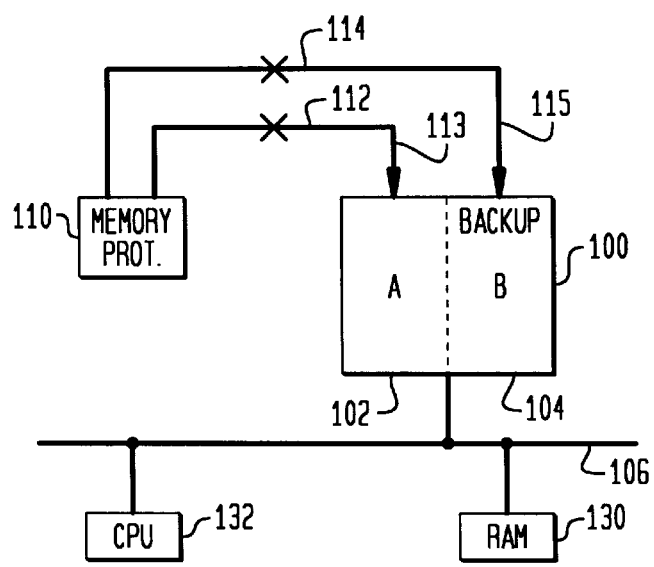
FIG. 2 is a block diagram of the hardware of applicants' embodiment.

FIG. 2 is block diagram illustrating the relationship of the RAM, the backup memory and a central processing unit (CPU) of the common control. Backup memory 100, RAM 130 and CPU 132 are all connected to bus 106. CPU 132 receives instructions from the backup memory or the RAM and controls read and write operations in both of these two memories. The backup memory has write protection applied from control 110.

The backup memory is divided into two segments and in applicants' preferred embodiment these two segments each occupy one-half of the memory space of the backup memory. The two segments 102 and 104 are shown in the diagram as A & B. The memory in the A section can only be written into if the write protect signal, shown as being sent over lead 113 and controlled by switch 112, is inactive. Similarly, the memory in the B portion of the backup memory can only be written into if the write protect signal, shown as being applied over lead 115 controlled by switch 114, is inactive. Normally, i.e., when the backup memory is not being updated, switches 112 and 114 are both off and write protect is applied to both halves. If one of the two halves of the backup memory is being updated, then write control of that segment of the backup memory is deactivated. Since, in accordance with the principles of applicants' invention, the two sides of the backup memory are never updated concurrently, the two switches 112 and 114 are never both in a state to cause deactivation of write control. In applicants' preferred embodiment, the process to ensure that no more than one switch is on is performed in software. Clearly, many hardware arrangements are also known to those of ordinary skill in the art to ensure that the two switches do not cause deactivation simultaneously. Many other well known arrangements for applying and removing write protect can be used.

Figure 3:
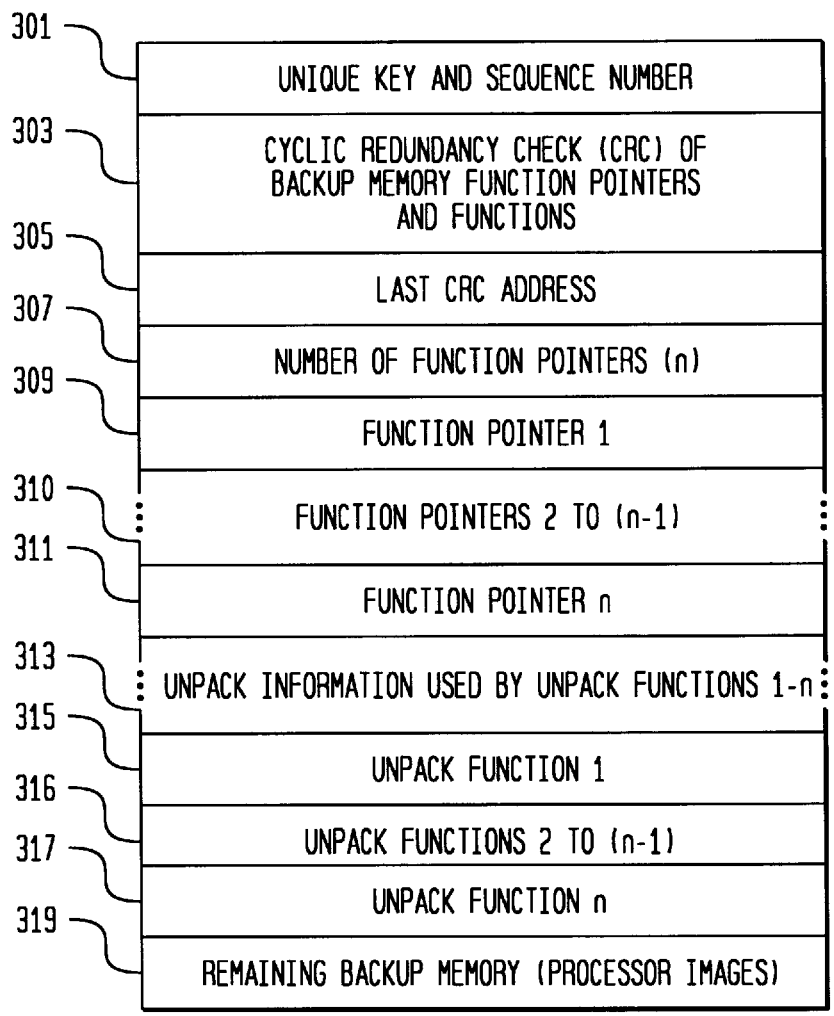
FIG. 3 is a layout of information stored in one segment of the backup memory.

FIG. 3 illustrates the layout of the backup memory. The first word 301 contains a unique key and sequence number representing, effectively, the issue number of the initialization. In case an off-line unit must be returned to active service because a on-line unit has failed, the contents of this key and sequence number are compared with the contents of the corresponding word in the other half of the backup memory to see if the older initialization data should be used. If both halves of the backup memory have a key plus a sequence number, this is an indication that an initialization of the newer version of the image in the backup memory has been completed; therefore, the contents of the older backup memory side should be ignored in favor of the contents of the newer version; the newer version is identified by the higher sequence number. The key is used to determine whether an accompanying sequence number is valid.

The next word 303 contains a cyclic redundancy check (CRC) code for that portion of the backup memory which includes function pointers and unpack functions for controlling the initialization of the RAM. The third word 305 is the address of the last word covered by the CRC check of the second word. The fourth word 307 indicates the number, n, of function pointers and functions stored in the first portion of the half of the memory. These four words are then followed by a series of function pointers (309, 310, 311) each of which function pointers points to one of the n unpack functions. Following the function pointers is unpack information used by unpack functions 1 through n. For example, the unpack information is used to locate the various segments of block 319. Unpack functions 1 through n are stored in blocks 315, 316, 317.

The second portion, 319, of one segment (half) of the backup memory contains text and data to be processed by the unpack functions and then stored in the RAM. The inactive RAM control programs and data support operations in the standby mode or the mode in which the RAM is being used for updating the backup memory. This static data includes a table specifying the start and end of each of the segments of portion 319; this table is pointed to by a pointer in the unpack function information 313.

In applicants' preferred embodiment there are four unpack functions. The first is the performance of a CRC check over all the blocks in section 319 of the backup memory. A CRC check sum is stored for every two kilobytes (2K) of this block of memory in a sixth segment of section 319. The second unpack function is to copy data into the RAM.

The data consists of 6 blocks. The first block is the program text for the inactive RAM control program, a program in which the common control cycles when it is not performing update functions and from which it is released upon receipt of a signal from the switching modular processor. This program is also used for controlling the updating of the backup memory from RAM, and supports diagnostic program execution. The second block is the static data required by the inactive RAM control. The third block comprises the transfer vectors used by the program when under RAM control in order to find the location of the program text of the various update programs executed by the common control. The fourth block comprises the program text of those programs. The fifth block comprises all static data and includes the start and end address of each 2K of the static data when it is stored in the RAM. The sixth segment stores the CRC check sum for each 2 kilobyte block of RAM memory. When the copy program has been completed, the five sections of RAM have been initialized and the holes between these sections of RAM are used to store dynamic data in the RAM. Note that the initialization data is stored within a block of 960K bytes (portion 319) while the RAM has 2 megabytes of memory.

The third unpack function performs a CRC check on data copied into the RAM and compares this with information stored in the backup memory sixth block, as described above. The fourth unpack function turns control over to the RAM. All four unpacked functions are called under the control of ROM; by turning over control to the RAM, the control by the ROM is terminated.

The inactive RAM control state is one wherein the common control cycles under the control of RAM and wherein the common control is either in an intermediate pump state or in the stand-by state with the other common control controlling the system.

The backup memory also contains additional data for use in initializing the RAM for subsequent initialization of the RAM of another (subtending) processor. The unpack information is used to locate this additional data. The initialized RAM contains a program for unpacking this additional data.

Figure 4:
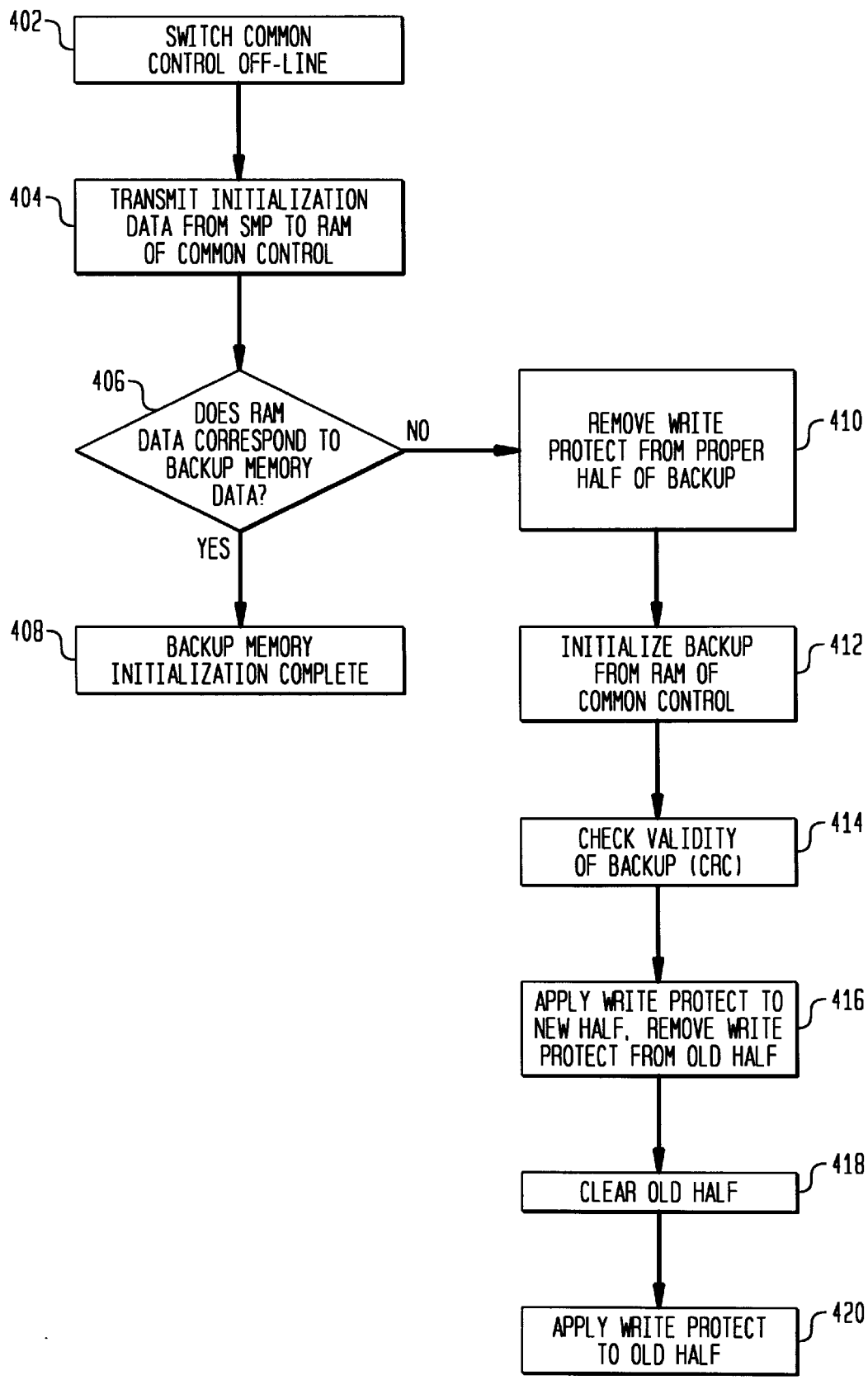
FIGS. 4 and 5 are flow diagrams of programs used to implement applicants' invention.

FIG. 4 illustrates the processes of updating one of the halves of the backup memory. In response to a request to update such memory, one of the common controls is switched off-line (action block 402). Data for the initialization is then transmitted from the switch module processor (SMP) of the module to which the DNU/SONET interface and its common control is attached (action block 404). Action block 404 corresponds to line 7 of FIG. 1. Test 406 is then used to determine whether the contents of the RAM are equivalent to the contents of the uncleared half of the backup memory. The test is performed by deriving data that would be written into a backup memory for each of the locations of the backup memory and checking whether the derived data is equal to the data already stored in the backup memory. (The key and sequence number stored in location 301 are not used by the switch module processor (SMP) as an indication of the issue number of an update, since any mistakes in generating such a number would lead to unnecessary program erase cycles.) If it is found that the contents of the RAM are equivalent to the contents of the backup memory, then the action is complete (action block 408) and effectively it is not necessary to update the backup memory. If the contents are not equivalent, then initialization of the cleared half of backup memory begins. Write protect is then removed from the new half (i.e., the half to be initialized) of the backup memory (action block 410memory has been initialized backup memory has been initialized (action block 412) and checked (action block 414), the key to the issue number is written last in the new version, and is cleared first in the old version; a new issue number with a valid key is an indication that the contents of the backup memory half are valid. Thereafter, the old half of the backup memory is cleared. First, write protect is reapplied to the new portion of the backup memory (action block 416) and write protect is removed from the old portion of the backup memory (action block 416) in order to clear it (action block 418). Thereafter, write protect is reapplied to that portion as well (action block 420).

Figure 5:
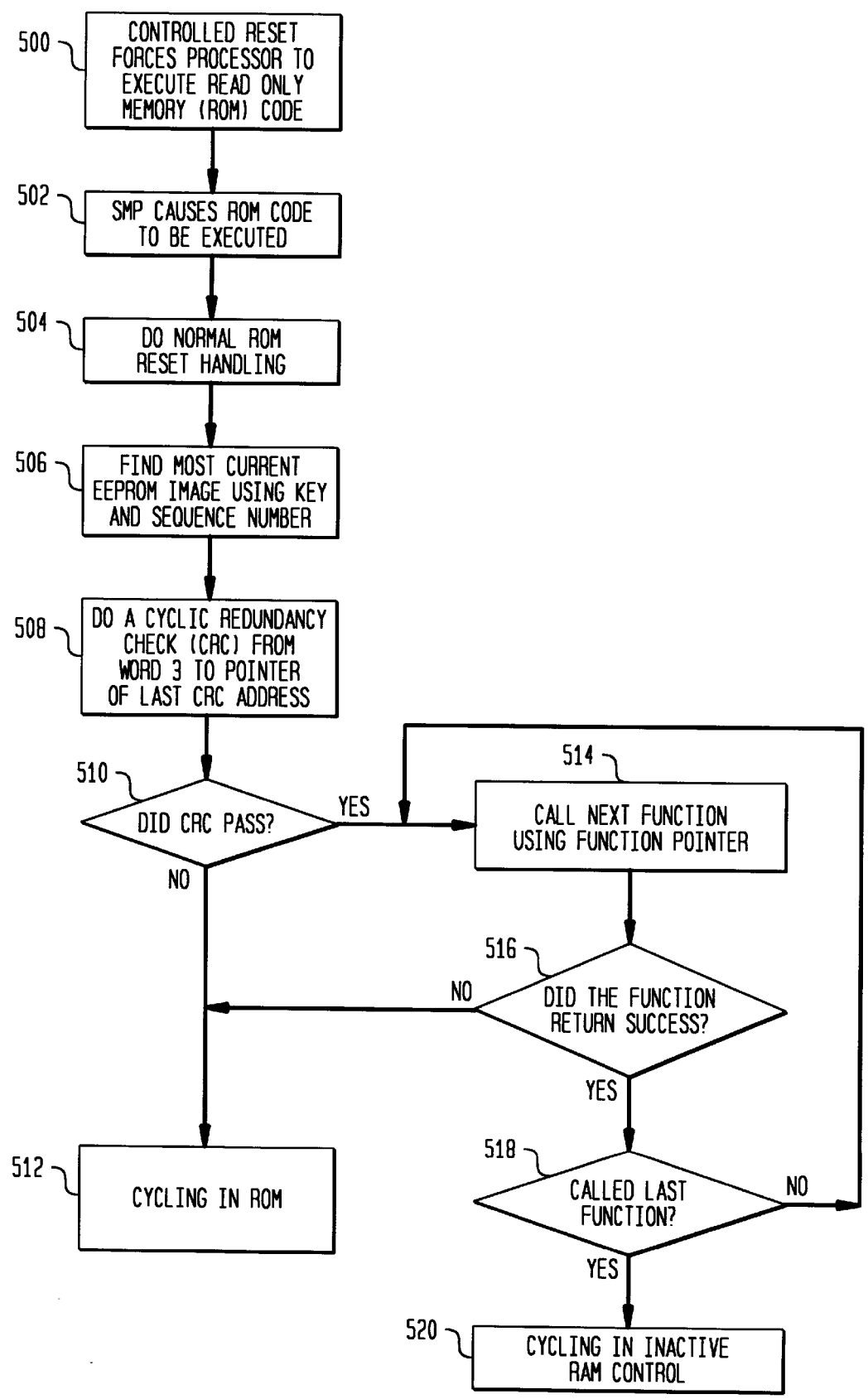

FIG. 5 illustrates the process of initializing the RAM from the backup memory. The switch module processor (SMP) sends a signal to the common control to cause the common control to be reset (action block 502) which causes the common control to execute code stored in ROM (action block 504). Action block 506 is used to determine which half of the backup memory is to be used for initializing. This is done by examining the first word, i.e., the word that contains the unique key and sequence number of each half of the backup memory in order to determine whether either of these words is zero (indicating cleared memory), or, if neither is zero, which sequence number and key represents the latest update. Since, following a successful update of one of the halves of the backup memory, the other half is cleared, such a situation can only happen if the request to initialize RAM is received while a backup memory half was being updated and the last step of the update had not been completed. Therefore, the half identified by the later (higher) sequence number accompanied by a valid key is the half that should be used for initializing the RAM.

Action block 508 indicates that a cyclic redundancy check (CRC) is performed from the third word of the selected half of the backup memory to the last CRC address 305 indicated by that third word. Test 510 is used to determine whether that CRC passed. If not, an indication that the common control is not available to become active, then the common control will continue cycling under the control of the ROM (action block 512). If the CRC passed, then the loop indicated by blocks 514, 516, and 518 is repeatedly executed. This loop consists of the ROM controlled program calling for the execution under backup memory control of the next function using the function pointer stored in the backup memory. (The first time block 514 is invoked this will be the first function.) Test 516 determines if the function was executed successfully; if not, action block 512, previously described, is executed. If the function was successfully executed, then test 518 determines if this the last function. If it is the last function, action block 520 (standby cycling under RAM control) is executed. The common control sends a signal to the switch module processor when it enters state 520, and a different signal when it enters state 512, so that the switch module processor knows whether the common control is available or not.

The backup memory is shown herein as separate from the RAM. This is not required, as long as separate write control can be applied to the two segments of the backup memory.

While in this description, the inactive segment of the backup memory is cleared, in an alternative embodiment, the key of the issue number can simply be invalidated as a sign that this segment is available for a new update. During the brief interval from acceptance of the update by assigning a valid key to its issue number, and the invalidation of the key of the issue number of the segment to be invalidated, the segment just validated becomes active, is recognized by the higher issue number, and would be used for initializing RAM. Thereafter, the newly validated segment is the only segment with a valid key and is used for initializing RAM.

Many variations can be derived by those of ordinary skill in the art without departing from the scope of the invention. The invention is only limited by the attached claims.

We claim:

1. A method of providing a reliable long term backup memory from memory having write protection arrangements comprising the steps of:

applying write protection when the backup memory is not being updated;

splitting said backup memory into at least two segments each segment having separately controllable write protection each segment having a complete copy of a block of backup data, and each block of backup data being stored in at least two of said segments;

updating one of said segments while removing write protection only from the segment being updated;

following an update of a segment of backup memory verifying contents of the updated segment; and if contents of the updated segment are verified, applying write protection to the updated segment.

2. The method of claim 1 further comprising the steps of:

following a successful updating of one segment of said backup memory, re-moving write protection from another segment which has not been updated; and clearing the other segment.

3. The method of claim 1 further comprising the steps of:

loading data and a control program for initializing said backup memory into a RAM; and loading data into said backup memory under the control of the control program stored in said RAM.

4. The method of claim 3 further comprising the step of:

loading the program for controlling said updating into said RAM from said backup memory.

5. The method of claim 1 wherein said RAM comprises said backup memory.

6. A method of updating a long term backup memory of a control unit from a source of updating data, comprising the steps of:

switching said control unit off-line;

transmitting initialization data from said source to a random access memory (RAM) of said control unit;

testing whether said initialization data corresponds to data stored in one segment of said backup memory each segment having a complete copy of a block of backup data, and each block of backup data being stored in at least two of said segments;

if said initialization data corresponds to data stored in said one segment of said backup memory, terminating the updating process and retaining write protection for said one segment; and if said initialization data does not correspond to data stored in said one segment of said backup memory, performing the updating process.

7. The method of claim 6 wherein said RAM comprises the segments of said backup memory.

8. A method of updating a long term backup memory of a control unit from a source of updating data, said backup memory having write protect arrangements for independently write protecting at least two segments, comprising the steps of:

switching said control unit off-line;

transmitting initialization data from said source to a random access memory (RAM) of said control unit;

removing write protect from one segment of said backup memory each segment having a complete copy of a block of backup data, and each block of backup data being stored in at least two of said segments;

initializing said one segment of said backup memory using said initialized data;

following an initialization of a segment of backup memory, verifying contents of the initialized segment; and if contents of the initialization segment are verified, applying write protection to the initialized segment.

9. The method of claim 8 further comprising the steps of:

testing whether said initialization data corresponds to data stored in another segment of said backup memory;

if said initialization data corresponds to data stored in said another segment of said backup memory, terminating the updating process; and if said initialization data does not correspond to data stored in said another segment of said backup memory, performing the steps of removing said write protect from said one segment and initializing said one segment.

10. The method of claim 9 wherein the step of initializing said one segment comprises the steps of:

checking the initialized backup memory data in said one segment against check sums of said initialization data;

reapplying write protect to said one segment of said backup memory; and initializing said control unit from data of said one segment of said backup memory.

11. The method of claim 8 further comprising the steps of:

reading corresponding data from different segments of said backup memory; and updating the one of said different segments whose data is blank.

12. The method of claim 11 further comprising the step of:

following said initialization, clearing backup memory data from said another segment.

13. The method of claim 11 wherein each initialized segment stores an identifying sequence number, further comprising the step of:

if none of said segments is blank, updating the segment having the oldest identifying sequence number.

14. A method of initializing a random access memory (RAM) from the contents of a long term backup memory comprising the steps of:

storing in the backup memory data for initializing said RAM, said data comprising error check data for an initialized version of said RAM;

storing in said backup memory a series of programs for controlling the initialization of said RAM;

initializing said RAM under the control of said series of programs;

checking that the initialized blocks of memory of said RAM have the same check sums as error check data stored for said RAM in said backup memory; and if the initialized blocks have the same checks sums, applying write protection to the initialized blocks.

15. The method of claim 14 wherein the process of storing said series of programs and said programs in said backup memory comprises the steps of:

loading data for initializing said backup memory into said RAM;

loading programs for controlling the initialization of said backup memory into said RAM; and loading data into said backup memory under the control of said control program stored in said RAM.

* * * * *